United States Patent Office 3,195,131
Patented July 13, 1965

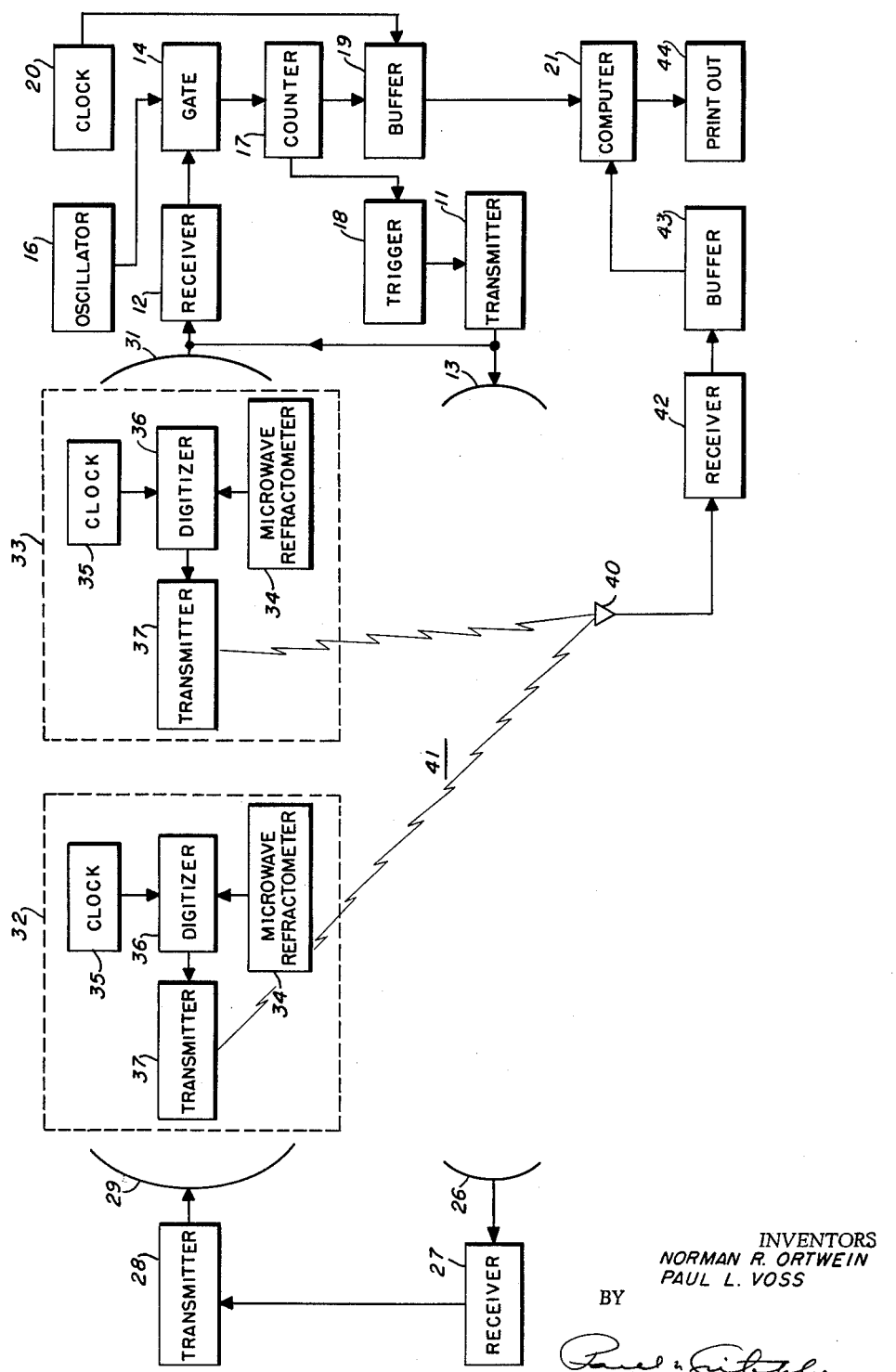

3,195,131
DISTANCE MEASURING SYSTEM UTILIZING OCEANIC INVERSION DUCT
Norman R. Ortwein, 4857 Orchard Ave., and Paul L. Voss, 6338 E. Lake Drive, both of San Diego, Calif.
Filed Jan. 10, 1963, Ser. No. 250,721
3 Claims. (Cl. 343—13)
(Granted under Title 35, U.S. Code (1952), sec. 266)

The invention described herein may be manufactured and used by or for the Government of the United States of America for governmental purposes without the payment of any royalties thereon or therefor.

The present invention relates generally to a distance measuring system utilizing oceanic inversion ducts and more particularly to a distance measuring system utilizing inversion ducts in which the refractive index at various locations in the duct are sampled concurrently with position readings at various positions for accurate averaging.

Refractive index inversions, or ducts, in the troposphere which trap VHF and UHF band radio signals have been known to exist for some time. The large extent of these inversions offers possibilities in the field of extreme range surveying over ocean expanses where conventional surveying methods cannot be used. Distance can be obtained due to utilization of the present invention by taking accurate measurements of the round trip transit time of an RF pulse propagating along a duct. The total transit time will then determine the distance if the velocity of propagation is known.

According to the invention a transmitter located at one point of the duct is triggered for a short pulse transmission and the transmitted wave propagated within the duct and received down the duct amplified and retransmitted back along the same duct, the distance being measured being between the two transmitters. At the first point of transmission the re-transmitted signal is received and an oscillator gated by the originally transmitted pulse and the received pulse, the cycles of oscillation then being counted in a conventional electronic counter. The total count being a measure of the transit time for the round trip transmission is then fed into one input of a computer. At the same time one or more samplings of the refractive index along the duct together with the geographical position of sampling is digitized and this information is fed into another input of a computer. The computer then computes the distance from a determination of the velocity of propagation learned from the refractive index and the transit time of transmissions. The time of each measurement is also recorded and when many samplings of the refractive index at various points along the duct are taken together with the transit time readings, an accurate averaging of the distance from the individual readings will result in an extremely accurate measure of the distance between the two stations.

It is thus an object of the present invention to provide a distance measuring system utilizing oceanic inversion ducts.

Another object of the present invention is a provision of a distance measuring system which is extremely accurate.

Yet another object of the present invention is to provide a distance measuring system which is simple to operate and requires a minimum of calibration.

A still further object of the invention is the provision of a distance measuring system utilizing conventional components.

Yet another object of the invention is to provide a distance measuring system which is relatively simple, inexpensive and requires a minimum of maintenance.

Other objects and many of the attendant advantages of this invention will be readily appreciated as the same becomes better understood by reference to the following detailed description when considered in connection with the accompanying drawing wherein:

The sole figure illustrates a block diagram of the preferred embodiment of the present invention.

Referring now to the drawing, there is shown transmitter 11 coupled to receiver 12 and antenna 13. The output of receiver 12 is connected to one input of gate 14. Oscillator 16 has an output also connected to an input of gate 14. The output of gate 14 is connected to the input of counter 17 which in turn is connected to trigger 18, the output of which is connected to transmitter 11. Another output from counter 17 is fed to an input of buffer 19. Clock 20 is also connected to buffer 19 the output of which is connected to computer 21. Antenna 26 is connected to the input of receiver 27 the output of which is connected to transmitter 28. Transmitter 28 is connected to antenna 29. Antenna 31 is connected to receiver 12. Aircrafts 32 and 33 have microwave refractometers 34, clocks 35, digitizers 36, and transmitters 37 carried therein. Aircrafts 32 and 33 and antennas 13, 26, 29 and 31 are all located within the oceanic inversion duct, shown generally at 41. Antenna 40 is connected to receive 42 which has an output connected to the input of buffer 43 whose output is connected to an input of computer 21. The output of computer 21 is taken at print-out 44.

Operation

In operation, trigger 18 triggers transmitter 11 for transmission of a short pulse of RF energy which is propagated through antenna 13 into the oceanic inversion duct 41. This transmission is picked up by receiving antenna 26 which is coupled into receiver 27. Receiver 27 merely amplifies the incoming signal without conversion or detection and passes it to transmitter 28. Antenna 29 then radiates the pulse of radio frequency energy at the same frequency that was received by antenna 26 and for the same duration, into oceanic inversion duct 41. Receiving antenna 31 then picks up this signal and couples it into receiver 12 where it is amplified and detected in conventional manner. The output of receiver 12 is coupled to gate 14 for gating the oscillator 16 into counter 17. Also coupled to receiver 12 is a small part of the output of transmitter 11. Thus gate 14 receives a first pulse upon the transmission at antenna 13 which gates gate 14 on and a second pulse from the reception at antenna 31 which gates gate 14 off. Hence, the output of oscillator 16 is only seen at counter 17 between the time of transmission of transmitter 11 and the time of reception at receiver 12. This interval represents the total round-trip transit time of transmissions in oceanic inversion duct 41. When counter 17 stops counting, an output is coupled to trigger 18 which retriggers transmitter 11 starting another cycle. The output of counter 17 is a digital count of the transit time of the wave propagation and is coupled to an input of computer 21 via buffer 25.

Since the velocity of propagation varies with refractive index, it is necessary to sample the refractive index along oceanic inversion duct 41 at various locations and thereby compute the average refractive index over a given period of time, which, taken with the average transit time, can be utilized to yield true distance between the station of transmitter 11 and receiver 12 and the station of transmitter 28 and receiver 27. This is accomplished by having at least one aircraft flying in the duct obtaining the refractive index with microwave refractometer 34, the aircraft's position (which can be determined by existing Loran equipment), and time from clock 35 and digitizing the information in digitizer 36. This information is then transmitted by transmitter 37 from the aircrafts 32 and 33 picked up by antenna 40, amplified and detected by receiver 42, and fed through buffer 43 to another input of computer 21. Computer 21 can then determine from the refractive index the velocity of radio waves within the duct which, taken with the transit round trip time, can yield the distance between the two stations. An output from clock 20 is also fed into computer 21 through buffer 25 for allowing computer 21 to correlate refractive index readings with distance measurements and also the time of the measurement. It can be seen that with many measurements taken over various time periods, an average can be obtained from the many samplings of refractive index and round trip times to yield an extremely accurate measurement of the distance between the two stations.

In one series of tests it was determined that the system will operate over a range of 500 miles with a 90% operational time efficiency, at 1000 miles with an operational time efficiency of 50%, and at ranges over 2000 miles at an operational time efficiency of approximately 15%.

Obviously many modifications and variations of the present invention are possible in the light of the above teachings. It is therefore to be understood that within the scope of the appended claims the invention may be practiced otherwise than as specifically described.

What is claimed is:

1. A distance measuring system utilizing oceanic inversion ducts comprising:
   (a) a first station having a transmitter connected to a triggering means for transmitting radio frequency pulses in an oceanic inversion duct;
   (b) a second station having a receiver for receiving said first transmissions and a transmitter for retransmitting said first transmissions;
   (c) receiving means at said first station for receiving said first transmissions and said retransmitted transmissions;
   (d) a gate, the output of said receiver connected to an input of said gate;
   (e) an oscillator connected to another input of said gate;
   (f) counting means, the output of said gate connected to said counting means for counting the gated output of said oscillator, said counting means having first and second outputs, said first output connected to said trigger means;
   (g) computing means, said second output of said counter operationally connected to one input of said computing means;
   (h) and means for introducing into said computing means successive readings of refractive index in said duct together with the geographic position of said refractive index, wherein said computer computes the velocity of propagation from said refractive index readings and the transit time of transmission between stations from said counter readings and further computes the distance between said first and second stations.

2. A distance measuring system utilizing oceanic inversion ducts comprising:
   (a) a first station having a transmitter connected to a triggering means for transmitting radio frequency pulses in an oceanic inversion duct;
   (b) a second station having a receiver for receiving said first transmissions and a transmitter for retransmitting said first transmissions;
   (c) receiving means at said first station for receiving said first transmissions and said retransmitted transmissions;
   (d) a gate, the output of said receiver connected to an input of said gate;
   (e) an oscillator connected to another input of said gate;
   (f) counting means, the output of said gate connected to said counting means for counting the gated output of said oscillator, said counting means having first and second outputs; said first output connected to said trigger means;
   (g) computing means, said second output of said counter operationally connected to one input of said computing means;
   (h) clock means having an output operationally connected to another input of said computer means;
   (i) and means for introducing successive readings of refractive index in said duct together with the geographic position of said refractive index, said last mentioned means including at least one aircraft flying in said duct between said first and second stations; means for sampling refractive index and geographic location in said aircraft; and transmitting means in said aircraft for transmitting said samplings to said first station; wherein said computer computes the velocity of propagation from said refractive index readings and the transit time of transmissions between stations from said counter readings and further computes the distance between said first and second stations with the time of measurement of said distance.

3. A distance measuring system utilizing oceanic inversion ducts comprising:
   (a) a first station having a transmitter for transmitting radio frequency pulses in a trade wind inversion duct;
   (b) a second station having a receiver for receiving said first transmissions and a transmitter for retransmitting said first transmissions;
   (c) receiving means at said first station for receiving said first transmissions and said retransmitted transmissions;
   (d) timing means, the output of said first station receiver connected to an input of said timing means, said timing means having an output proportional to the time between said first transmission and said second transmission outputs of said first station receiver;
   (e) computing means, said output of said timing means operationally connected to one input of said computing means;
   (f) clock means having an output connected to another input of said computer means;
   (g) and means for introducing successive readings of refractive index in said duct together with the geographic position of said refractive index, wherein said last mentioned means includes at least one aircraft flying in said duct between said first and second stations; means for sampling refractive index in geographic location in said aircraft; and transmitting means in said aircraft for transmitting said samplings to said first station; wherein said computer computes the velocity of propagation from said refractive index readings and the transit time of transmissions between stations from said counter readings and further computes the distance between said first and second station with the time of measurement of said distance.

References Cited by the Examiner

UNITED STATES PATENTS

| | | | |
|---|---|---|---|
| 2,653,220 | 9/53 | Bays | 325—28 |
| 2,779,018 | 1/57 | Gregoire et al. | 343—12 |
| 3,030,500 | 4/62 | Katzin | 343—100 |
| 3,095,564 | 6/63 | Cartwright | 343—12 X |

CHESTER L. JUSTUS, *Primary Examiner.*